United States Patent
Kung et al.

(10) Patent No.: US 7,332,879 B2
(45) Date of Patent: Feb. 19, 2008

(54) CONTROL METHOD AND DEVICE FOR A POWER-CONVERTING MODULE THAT DRIVES A LIGHT-EMITTING COMPONENT

(75) Inventors: Nien-Hui Kung, Miao-Li Hsien (TW); Yiu-I Lin, Shu-Lin (TW); Der-Jiunn Wang, Hsin-Chu (TW); Chao-Hsuan Chuang, Chu-Pei (TW); Jien-Sheng Chen, Miao-Li Hsien (TW); Shui-Mu Lin, Taichung Hsien (TW); Wei-Hsin Wei, Taichung Hsien (TW)

(73) Assignee: Richtek Technology Corp., Hsin-Chu Hsien (TW)

( * ) Notice: Subject to any disclaimer, the term of this patent is extended or adjusted under 35 U.S.C. 154(b) by 449 days.

(21) Appl. No.: 10/919,015

(22) Filed: Aug. 16, 2004

(65) Prior Publication Data

US 2006/0033484 A1    Feb. 16, 2006

(51) Int. Cl.
*H05B 37/02* (2006.01)
*H02M 3/156* (2006.01)
(52) U.S. Cl. ...................... 315/307; 323/351
(58) Field of Classification Search ................ 323/234, 323/318, 351; 345/102, 212; 315/307
See application file for complete search history.

(56) References Cited

U.S. PATENT DOCUMENTS 6,445,143 B1 * 9/2002 Min ............................ 315/307

* cited by examiner

*Primary Examiner*—Karl Easthom
*Assistant Examiner*—Richard V. Muralidar
(74) *Attorney, Agent, or Firm*—Trop, Pruner & Hu, P.C.

(57) ABSTRACT

A control device, which controls a power-converting module that is coupled to a light-emitting component, includes a duration detecting unit and a control signal generator. The duration detecting unit compares the duration of a predetermined logic state of a pulsating input dim control signal with a reference time period. The control signal generator is enabled by the duration detecting unit so as to generate a control signal that enables the power-converting module to generate a drive voltage for driving the light-emitting component when the duration of the predetermined logic state is not longer than the reference time period. The duration detecting unit disables the control signal generator to disable the power-converting module when the duration of the predetermined logic state is longer than the reference time period.

4 Claims, 1 Drawing Sheet

CONTROL METHOD AND DEVICE FOR A POWER-CONVERTING MODULE THAT DRIVES A LIGHT-EMITTING COMPONENT

BACKGROUND OF THE INVENTION

1. Field of the Invention

The invention relates to a method and device for controlling light-emitting components, more particularly to a control method and device for controlling a power-converting module that drives a light-emitting component.

2. Description of the Related Art

A conventional driver integrated circuit (driver IC) for driving a light-emitting diode (LED) must also provide a function of controlling the brightness output of the LED in a linear and stable manner so that an electronic apparatus that uses the LED as a backlighting source, such as a mobile phone, a personal digital assistant (PDA), etc., can have a stable and good display screen. Currently, a method widely used in this type of driver IC relies upon pulse signals for controlling the brightness output of the LED. In particular, to achieve a desired brightness, pulse signals with a predetermined frequency are fed to the driver IC so as to alternately turn on and turn off the LED. When the frequency of the pulse signals becomes higher, the brightness output of the LED becomes brighter. On the other hand, when the frequency of the pulse signals becomes lower, the brightness output of the LED becomes dimmer. However, to operate the driver IC in this manner, aside from the fact that a larger amount of power is consumed, a side effect of electromagnetic interference is also encountered due to the rapid turn on and turn off activity of the driver IC, which has an adverse effect on other electronic components. Therefore, to overcome the aforesaid drawback, a pulse-width-modulation (PWM) control circuit has been proposed heretofore for controlling the driver IC so as to adjust the drive current that is supplied by the driver IC to the LED, thereby controlling the brightness output of the LED.

When the conventional PWM control circuit is in use, an enable signal is provided to activate the driver IC, and a brightness control signal is provided to control driving of the LED. The conventional driver IC has separate input terminals for receiving the enable signal and the brightness control signal, respectively. In view of the current trend toward miniaturization of electronic components, a reduction in the terminal count of the driver IC is highly desirable.

SUMMARY OF THE INVENTION

Therefore, the object of the present invention is to provide a control method and device for controlling a power-converting module that drives a light-emitting component so as to overcome the aforesaid drawbacks associated with the prior art.

According to one aspect of the present invention, there is provided a control method for controlling a power-converting module that is coupled to a light-emitting component. The control method comprises the steps of:

a) comparing duration of a predetermined logic state of a pulsating input dim control signal with a reference time period;

b) when the duration of the predetermined logic state of the pulsating input dim control signal is not longer than the reference time period, generating a pulse-width-modulated control signal that corresponds to the pulsating input dim control signal and that is provided to the power-converting module, thereby enabling the power-converting module to generate a drive voltage for driving the light-emitting component to generate a brightness output that corresponds to the pulsating input dim control signal; and c) when the duration of the predetermined logic state of the pulsating input dim control signal is longer than the reference time period, disabling the power-converting module to turn off the light-emitting component.

According to another aspect of the present invention, there is provided a control device for controlling a power-converting module that is coupled to a light-emitting component. The control device comprises a duration detecting unit and a control signal generator.

The duration detecting unit is adapted for comparing duration of a predetermined logic state of a pulsating input dim control signal with a reference time period.

The control signal generator is coupled to the duration detecting unit, and is enabled by the duration detecting unit so as to generate a pulse-width-modulated control signal that corresponds to the pulsating input dim control signal and that is to be provided to the power-converting module, thereby enabling the power-converting module to generate a drive voltage for driving the light-emitting component to generate a brightness output that corresponds to the pulsating input dim control signal, when the duration detecting unit determines the duration of the predetermined logic state of the pulsating input dim control signal to be not longer than the reference time period.

The duration detecting unit disables the control signal generator so as to disable the power-converting module and turn off the light-emitting component when the duration detecting unit determines the duration of the predetermined logic state of the pulsating input dim control signal to be longer than the reference time period.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
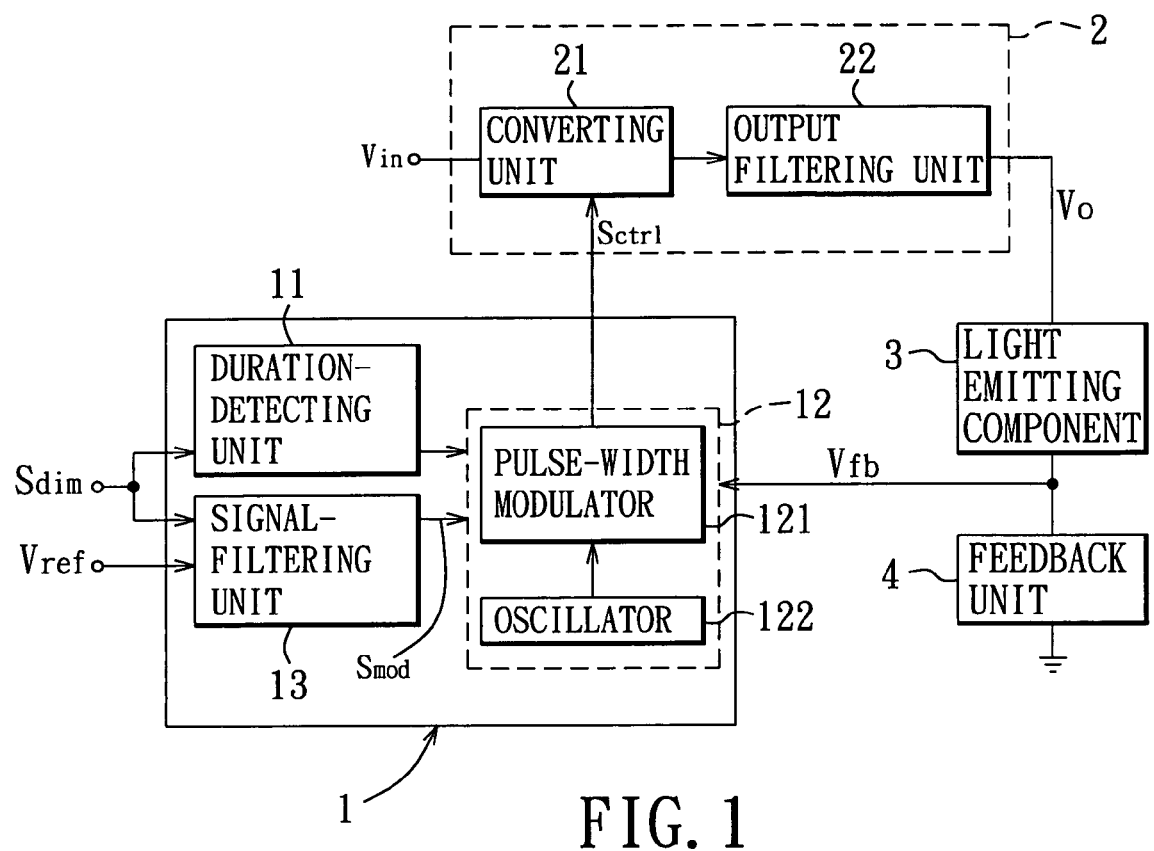
FIG. 1 is a schematic circuit block diagram showing the preferred embodiment of a control device for controlling a power-converting module that is coupled to a light-emitting component.

Referring to FIG. 1, the preferred embodiment of a control device 1 according to the present invention is adapted for controlling a power-converting module 2 that is coupled to a light-emitting component 3, such as an LED, LCD or OLED. The control device 1 comprises a duration detecting unit 11 and a control signal generator 12.

Figure 2:
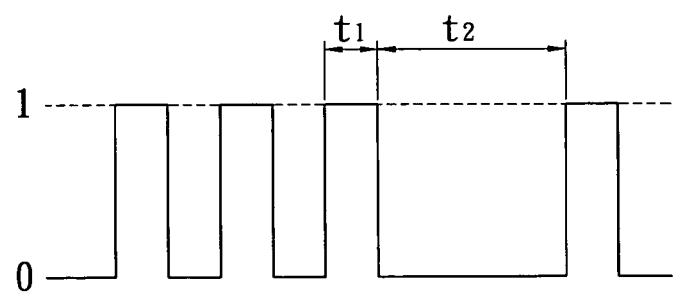
FIG. 2 illustrates a pulsating input dim control signal suitable for use in the preferred embodiment.

The duration detecting unit 11 is adapted for comparing the duration ($t_2$) of a predetermined logic state of a pulsating input dim control signal ($S_{dim}$) with a reference time period ($t_3$). Referring to FIG. 2, in this embodiment, since the duration detecting unit 11 is designed to be low active, the predetermined logic state is a low logic state of the pulsating input dim control signal ($S_{dim}$). It should be noted that the duration detecting unit 11 may be designed to be high active. In this case, the operating principles to be described hereinbelow are to be performed inversely.

The control signal generator 12 is coupled to the duration detecting unit 11, and is enabled by the duration detecting unit 11 so as to generate a pulse-width-modulated control signal ($S_{ctrl}$) that corresponds to the pulsating input dim control signal ($S_{dim}$) and that is to be provided to the power-converting module 2, thereby enabling the power-converting module 2 to generate a drive voltage ($V_o$) for driving the light-emitting component 3 to generate a brightness output that corresponds to the pulsating input dim control signal ($S_{dim}$), when the duration detecting unit 11 determines the duration ($t_2$) of the predetermined logic state of the pulsating input dim control signal ($S_{dim}$) to be not longer than the reference time period ($t_3$).

The duration detecting unit 11 disables the control signal generator 12 so as to disable the power-converting module 2 and turn off the light-emitting component 3 when the duration detecting unit 11 determines the duration ($t_2$) of the predetermined logic state of the pulsating input dim control signal ($S_{dim}$) to be longer than the reference time period ($t_3$).

The control device 1 further comprises a signal-filtering unit 13 for generating a modulator control signal ($S_{mod}$) that corresponds to a reference voltage ($V_{ref}$) amplified by again (G) equal to an average value (or DC value) of the pulsating input dim control signal ($S_{dim}$).

The control signal generator 12 is coupled to the signal-filtering unit 13, and includes a pulse-width modulator 121 that receives the modulator control signal ($S_{mod}$), and an oscillator 122 that is coupled to the pulse-width modulator 121 and that provides an oscillator signal to the pulse-width modulator 121. The pulse-width modulator 121 generates the pulse-width-modulated control signal ($S_{ctrl}$) from the modulator control signal ($S_{mod}$) and the oscillator signal. In particular, if the voltage level of the modulator control signal ($S_{mod}$) is higher, the duty cycle of the pulse-width-modulated control signal ($S_{ctrl}$) will be lower. Otherwise, the duty cycle of the pulse-width-modulated control signal ($S_{ctrl}$) will be higher.

The power-converting module 2 includes a converting unit 21 and an output filtering unit 22 coupled to the converting unit 21. The converting unit 21 is adapted to receive an input voltage ($V_{in}$) and the pulse-width-modulated control signal ($S_{ctrl}$), and converts the input voltage ($V_{in}$) into a pulse-shaped high-frequency voltage with reference to the pulse-width-modulated control signal ($S_{ctrl}$). The pulse-shaped high-frequency voltage is subsequently provided to the output filtering unit 22 for filtering so as to generate the direct current drive voltage ($V_o$) that is supplied to the light-emitting component 3. The voltage level of the drive voltage ($V_o$) is proportional to the duty cycle of the pulse-width-modulated control signal ($S_{ctrl}$). That is, the higher the duty cycle of the pulse-width-modulated signal control ($S_{ctrl}$), the higher will be the voltage level of the drive voltage ($V_o$). Accordingly, the lower the duty cycle of the pulse-width-modulated signal control ($S_{ctrl}$), the lower will be the voltage level of the drive voltage ($V_o$). Therefore, through the pulsating input dim control signal ($S_{dim}$), the pulse-width-modulated control signal ($S_{ctrl}$) can be controlled so that the desired drive voltage ($V_o$) can be generated from the input voltage ($V_{in}$).

Preferably, the light-emitting component 3 is coupled to a grounded feedback unit 4, such as a feedback resistor. The brightness output of the light-emitting component 3 depends on the amount of drive current flowing therethrough. Since the drive current also flows through the feedback unit 4, a feedback signal ($V_{fb}$) that is indicative of the amount of current flow through the light-emitting component 3 can be obtained from the feedback unit 4. The pulse-width modulator 121 is coupled to the feedback unit 4, receives the feedback signal ($V_{fb}$), and stabilizes the pulse-width-modulated control signal ($S_{ctrl}$) with reference to the feedback signal ($V_{fb}$) in a manner well known in the art. As a result, the drive voltage ($V_o$) can be maintained at the desired voltage level to ensure a stable brightness output from the light-emitting component 3.

It should be noted herein that the control device 1 is capable of being realized in the form of an integrated circuit. Moreover, since adjustment of the drive voltage ($V_o$) by the power-converting module 2 through pulse-width-modulation control is performed in a manner well known to those skilled in the art, further details of the same will be dispensed herewith for the sake of brevity.

In sum, to adjust the brightness output of the light-emitting component 3 through the control device 1 of the preferred embodiment, the duration detecting unit 11 first compares the duration ($t_2$) of the predetermined logic state (e.g., the low logic state) of the pulsating input dim control signal ($S_{dim}$) with the reference time period ($t_3$). When the duration ($t_2$) of the predetermined logic state of the pulsating input dim control signal ($S_{dim}$) is longer than the reference time period ($t_3$), the duration detecting unit 11 disables the control signal generator 12 so as to disable the power-converting module 2 and turn off the light-emitting component 3. Otherwise, the control signal generator 12 is enabled by the duration detecting unit 11 so as to generate the pulse-width-modulated control signal ($S_{ctrl}$) that corresponds to the modulator control signal ($S_{mod}$) from the signal-filtering unit 13, which in turn corresponds to the pulsating input dim control signal ($S_{dim}$), and that is provided to the power-converting module 2. Upon receipt of the pulse-width-modulated control signal ($S_{ctrl}$), the power-converting module 2 is enabled to generate the drive voltage ($V_o$) for driving the light-emitting component 3 to generate a brightness output that corresponds to the pulsating input dim control signal ($S_{dim}$). In the view of the abovementioned construction, a reduction in terminal count is possible using the control device 1 of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A control device for controlling a power-converting module that is coupled to a light-emitting component, said control device comprising:
   a duration detecting unit adapted for comparing duration of a predetermined logic state of a pulsating input dim control signal with a reference time period; and
   a control signal generator coupled to said duration detecting unit and enabled by said duration detecting unit so as to generate a pulse-width-modulated control signal that corresponds to the pulsating input dim control signal and that is to be provided to the power-converting module, thereby enabling the power-converting module to generate drive voltage for driving the light-emitting component to generate a brightness output that corresponds to the pulsating input dim control signal, when said duration detecting unit determines the duration of the predetermined logic state of the pulsating input dim control signal to be not longer than the reference time period;

said duration detecting unit disabling said control signal generator so as to disable the power-converting module and turn off the light-emitting component when said duration detecting unit determines the duration of the predetermined logic state of the pulsating input dim control signal to be longer than the reference time period; and a signal-filtering unit for generating a modulator control signal that corresponds to a reference voltage amplified by a gain equal to an average value of the pulsating input dim control signal, said control signal generator being coupled to said signal-filtering unit and generating the pulse-width-modulated control signal from the modulator control signal.

2. The control device as claimed in claim 1, wherein said control signal generator includes a pulse-width modulator that receives the modulator control signal, and an oscillator that is coupled to said pulse-width modulator and that provides an oscillator signal to said pulse-width modulator, said pulse-width modulator generating the pulse-width-modulated control signal from the modulator control signal and the oscillator signal.

3. The control device as claimed in claim 2, wherein said pulse-width modulator is adapted to receive a feedback signal that is indicative of amount of current flow through the light-emitting component, and stabilizes the pulse-width-modulated control signal with reference to the feedback signal.

4. The control device as claimed in claim 1, wherein the predetermined logic state of the pulsating input dim control signal is one of a low logic state and a high logic state.

* * * * *